Oct. 4, 1932.   E. A. SPERRY   1,880,994
INDICATOR FOR AIRCRAFT
Filed Oct. 11, 1918
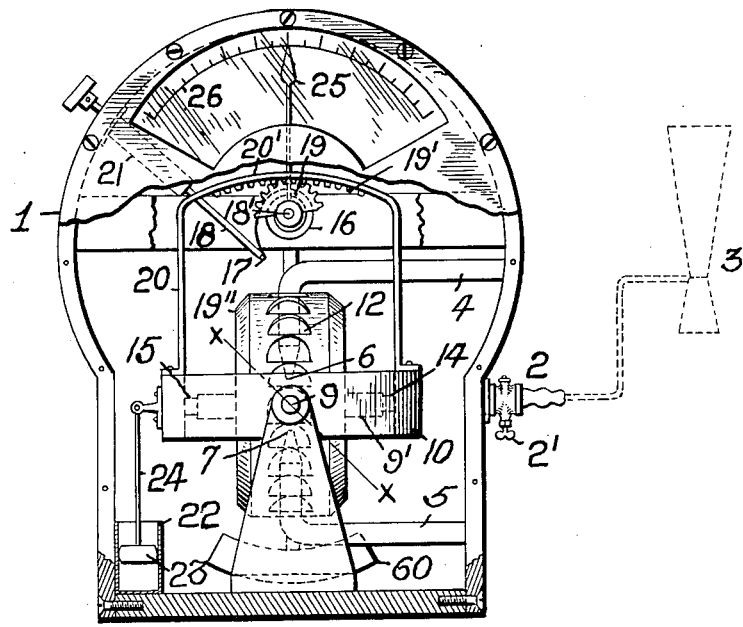
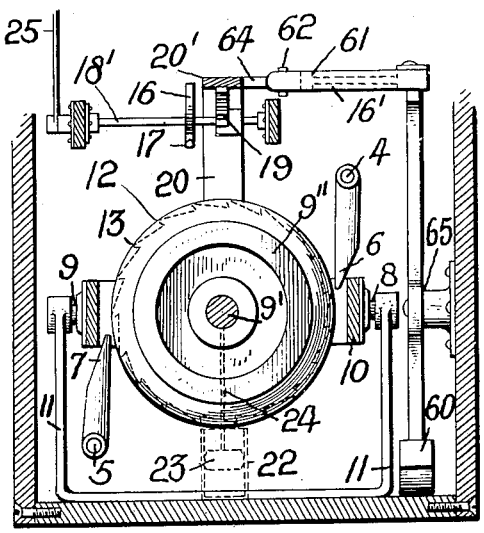
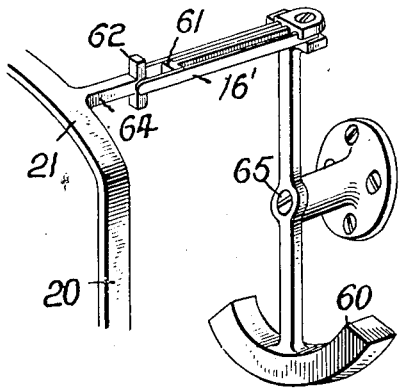
INVENTOR
ELMER A. SPERRY.
BY Herbert F. Thompson
his ATTORNEY.

Patented Oct. 4, 1932

1,880,994

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

INDICATOR FOR AIRCRAFT

Application filed October 11, 1918. Serial No. 257,776.

This invention relates to apparatus for indicating the true vertical on moving vehicles, such as aeroplanes and other aircraft. While the ordinary pendulum or plumb bob furnishes an accurate means of indicating the vertical on a stationary object, it has been found useless on rapidly moving aeroplanes. I am aware, also, that gyroscopic pendulums of various kinds have been tried for this purpose but they, too, have not proved entirely successful owing to the severe and continued acceleration pressures encountered in the flight of an aeroplane.

One of the objects of the present invention is to devise an apparatus in which a means is brought into action whenever acceleration pressures arise, due especially to turning of the aircraft, for exerting a force which opposes the natural tendency of a pendulous indicator to be deflected by said acceleration pressure.

Stated in a different way, my invention utilizes the natural tendency of a pendulum to swing out under the action of acceleration forces to oppose the natural tendency of a two-degree of freedom gyroscope to precess when the airplane changes its angular position about an axis. By balancing these two forces an indication of the horizontal or vertical may be secured.

More specifically my indicator is intended to maintain the horizontal or vertical during turning and banking of the aircraft, the pendulum being mounted so as to swing athwartships about a fore and aft axis, and the gyroscope being mounted with its precession axis fore and aft and its spinning axis horizontal. A connection, preferably a yielding one, is provided between the pendulum and gyroscope of such a character that the acceleration force due to turning, i. e. centrifugal force, on the pendulum will oppose the precessional forces of the gyroscope. It is obvious, however, that the broad principles of my invention may be applied to indicate the vertical about any other axis of the aircraft in which changes in the angular position of the craft are accompanied by acceleration thereof in the broad sense, i. e., a change in the departure of the craft from uniform motion in a straight line.

A further object of the invention is the improvement of gyroscopic apparatus of this character, especially adapting it for use on airplanes. Other objects of the invention will be brought out as the description proceeds.

Referring to the drawing in which what are now considered the preferred forms of my invention, are illustrated:

Fig. 1 is a front elevation, with parts broken away, showing one form of gyroscopic apparatus embodying the invention.

Fig. 2 is a vertical section taken at right angles to Fig. 1, the upper part of the apparatus being omitted.

Fig. 3 is a perspective view illustrating in detail the pendulum controller.

The gyroscope is preferably air driven. For this purpose the apparatus is shown as enclosed within an air-tight casing 1 from which the air is exhausted through a valve 2, by means of a pump, preferably in the form of a Venturi tube 3 mounted on the aeroplane so as to receive the maximum velocity of air. One or more tubes 4 and 5 lead from the exterior of the casing to nozzles 6 and 7 in Fig. 2 adjacent the impeller of the gyroscope.

Preferably said nozzles are located adjacent the axis 8—9 about which the gyroscope oscillates or precesses. The gyroscope proper is shown as comprising a rotor 9″ secured to a shaft 9′ which is journalled in ring or frame 10. Said ring in turn is mounted in a bracket 11 for oscillation about the aforesaid axis 8—9.

Preferably the buckets or blades 12 against which air jets are adapted to strike are cut or otherwise formed in the periphery of the rotor itself. Said buckets are preferably of a peculiar shape, having a curved and preferably also undercut rear surface 13, in order that a continuous impelling effort may be exerted by the jets irrespective of the turning of the gyroscope about axis 8—9. With straight blades such as have heretofore been used, I find that when the gyroscope becomes inclined about said axis, say to the position indicated by the dotted line X—X, a large part of the air from the jets will be spilled off the buckets without exerting any appreciable impulse to the wheel, but with curved and preferably undercut buckets of this nature, the air is caught within the buckets even when the gyroscope is inclined and a continuous impelling effort is therefore secured.

The oscillatory axis 8—9 of the gyroscope, as well as the spinning axis 14—15, is placed at an angle to the vertical so that precession of the gyroscope will be produced whenever the aeroplane turns in azimuth. As shown, axis 8—9 is longitudinal of the aircraft and the spinning axis 14—15 athwartships.

In order to centralize the gyroscope with respect to the vertical, I provide a yielding means, such as a spring 16.

Spring 16 is shown in the form of a spiral spring, one end of which 17 is secured to an adjustable rod 18 while the other is secured to the shaft 18′ of a pinion or gear sector 19 journalled in the frame 1. Said pinion is shown as meshing with an internal gear 19′ on a frame 20, mounted on the ring 10 of the gyroscope. The rod 18 is frictionally and slidably mounted in the sleeve 21 so that the position of the end 17 may be varied, which will alter the centralized position of the hair spring.

A pointer 25 or other suitable indicating means is secured to the shaft 18′ of pinion 19 as the indicator. A scale 26 may be provided on which the pointer is read.

Preferably, a damping means is provided for the gyroscope, said means being shown in the form of a dash-pot 22 within which is mounted a piston 23 secured by a link 24 to the ring 10.

The most effective and simple means known for indicating the average position of the vertical is a simple pendulum and I accordingly prefer to employ a pendulum as the base, using the gyroscope as a means for preventing the acceleration forces of turning from displacing the pendulum and indicator. Accordingly I pivot a pendulum 60 within the casing 1 about an axis 65 parallel and preferably in line with the trunnion axis 8—9 of the gyroscope. Said pendulum is shown as connected to the precessional frame of the gyroscope directly or by a centralizing spring 16′. The centralizing spring when used may consist of a flat U-shaped spring bearing adjacent each end against a stop 61 rigidly secured to the pendulum and also embracing one end 62 of an arm 64 secured to the loop 20 on ring 10, or to any other convenient point on the gyroscope.

By this means, the control of the gyroscope is rendered more or less independent of the aircraft, and furthermore, the opposing force which opposes the precession of the gyroscope is brought into action automatically upon the turning of the aircraft, since the pendulum 60, which is pivoted about a fore and aft axis of the aeroplane will be swung outwardly by the centrifugal force an amount directly proportional to the rate of turning. Or, looked at in a different way, upon turning of the craft, the tendency of the gyroscope to precess will oppose the tendency of the pendulum to swing out under centrifugal forces and thereby the pendulum and gyroscope will remain vertical. By use of the pendulum also, the gyroscope is unaffected by temporary rolling or tilting of the aeroplane, since the pendulum will hang vertically irrespective of the rolling of the craft.

It will be understood that for proper results the relative value of the opposing forces brought into action about turning of the aircraft should be properly adjusted. The simplest adjustment is effected by changing the speed of the rotor by adjusting valve stem 2′ of valve 2. Changing the pendulum would also alter the relative value of the forces. Once the device is properly adjusted, however, it should operate within reasonable limits regardless of the speed of the airplane because since the rotor is driven by the passage of the aircraft through the air, its speed will vary with the speed of the airplane and, therefore, the variation in effect on the pendulum of turning through a given angle due to changes in the linear speed of the craft will be automatically compensated for. Also, it should be apparent that if the gyroscopic effort predominates or if the gyroscope be revolved in the opposite direction to that above indicated, the instrument will become a sensitive turn indicator, the pointer being moved away from its central position upon a turn in one direction and moved in the opposite direction upon an opposite turn. Also, since an airplane nearly always banks when it turns, the instrument will indicate turns even if adjusted so that the pointer remains vertical since the pointer will at that time move over the scale by the fact that the housing is tilted around it.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flying indicator adapted to be mounted on an aeroplane, a gyroscope, means for mounting the same on the aircraft for precession about an axis at an angle to the vertical, a pendulum yieldingly connected to said gyroscope to exert a force thereon upon turning of the aircraft, and an index for indicating the apparent movements of the gyroscope.

2. In a flying indicator adapted to be mounted on an aeroplane, a gyroscope, means for mounting the same on the aircraft for precession about an axis at an angle to the vertical, comprising a part adapted to be fixed to said craft in which the gyroscope is mounted for turning about an axis at an angle to the vertical, a pendulum yieldingly connected to said gyroscope to exert a force thereon upon turning of the aircraft, and an index for indicating the apparent movements of the gyroscope.

3. In a position indicator for aircraft, a gyroscope having but two degrees of freedom and mounted for precession about an axis at an angle to the vertical and for spinning about a second axis, and a pendulum yieldingly connected to said gyroscope to exert a force thereon about said precession axis upon acceleration of the aircraft.

4. In a position indicator for aircraft, a two degree of freedom gyroscope mounted for precession about an axis at an angle to the vertical, a pendulum connected to said gyroscope to exert a force thereon upon turning of the aircraft in opposition to the natural precession of the gyroscope, and means for spinning said gyroscope at a speed varying with the speed of the aircraft.

5. An indicator of lateral tilt for aircraft comprising a pendulous element subject to the acceleration forces of turning, a gyroscope, means for mounting the same with two degrees of freedom to precess on turning, and means connecting said pendulum and gyroscope so that during a turn the tendency of the gyroscope to precess opposes the natural action of the pendulum.

6. The combination with a dirigible craft, of a gyroscopic indicator of the vertical comprising a rotor mounted to oscillate about an axis normally in fixed relation to the craft to lie substantially in the plane of travel thereof, means for driving the rotor in proportion to the speed of the craft, a pendulum pivoted about an axis parallel to said oscillatory axis, yielding means connecting said pendulum and gyroscope, and an indicator pivoted about a parallel axis and connected to the gyroscope and pendulum.

7. An inclinometer comprising in combination, a casing, a pendulum mounted therein to swing about an axis, a gyroscope, means pivotally mounting the same in the casing so that it may have two degrees of freedom, means connecting the pendulum with the gyroscope, and an indicator connected with the gyroscope and adapted to indicate the angular displacement of said gyroscope relatively to said casing.

8. An inclinometer comprising in combination, a casing, a pendulum pivotally mounted therein, a frame pivotally mounted in the casing, a gyroscope journaled in said frame, yielding means connecting the pendulum and frame, said frame being adapted to be turned by the force of the gyroscope when the casing is moved about a vertical axis, and means indicating the angular displacement of said pendulum and gyroscope relatively to said casing, said means being operatively connected to said pendulum and gyroscope.

In testimony whereof I affix my signature.

ELMER A. SPERRY.